United States Patent
Leizerson et al.

(10) Patent No.: US 11,692,810 B2
(45) Date of Patent: Jul. 4, 2023

(54) PHOTOACOUSTIC EXCITATION SENSING ENHANCED BY CROSS-CORRELATED UNFOCUSED SPECKLE IMAGES

(71) Applicant: Elbit Systems Land and C4I Ltd., Netanya (IL)

(72) Inventors: Ilya Leizerson, Netanya (IL); Barak Alfassi, Netanya (IL); Alon Heimer, Netanya (IL); Sharone Aloni, Netanya (IL); Adam Wolff, Netanya (IL)

(73) Assignee: Elbit Systems Land and C4I Ltd., Netanya (IL)

( * ) Notice: Subject to any disclaimer, the term of this patent is extended or adjusted under 35 U.S.C. 154(b) by 205 days.

(21) Appl. No.: 16/636,963

(22) PCT Filed: Aug. 6, 2018

(86) PCT No.: PCT/IL2018/050867
§ 371 (c)(1),
(2) Date: Feb. 6, 2020

(87) PCT Pub. No.: WO2019/030751
PCT Pub. Date: Feb. 14, 2019

(65) Prior Publication Data
US 2020/0371018 A1   Nov. 26, 2020

(30) Foreign Application Priority Data
Aug. 6, 2017 (IL) .......................................... 253862

(51) Int. Cl.
*G01B 9/02* (2022.01)
*G01N 21/17* (2006.01)
(Continued)

(52) U.S. Cl.
CPC ......... *G01B 9/02094* (2013.01); *G01H 9/008* (2013.01); *G01N 21/1702* (2013.01);
(Continued)

(58) Field of Classification Search
CPC .............. G01B 11/162; G01B 9/02094; G01B 9/02095; G01B 9/02096; G01H 9/00;
(Continued)

(56) References Cited

U.S. PATENT DOCUMENTS 4,641,527 A   2/1987   Hiroi et al.
4,870,865 A   10/1989  Hane et al.
(Continued)

FOREIGN PATENT DOCUMENTS

JP   2004101189   4/2004
WO   WO-2017203525 A1 * 11/2017  ......... G01N 21/4795
(Continued)

OTHER PUBLICATIONS

Extended European Search Report for EP Patent Application No. 18844106.7, dated Apr. 19, 2021.
(Continued)

*Primary Examiner* — David L Singer
(74) *Attorney, Agent, or Firm* — Pearl Cohen Zedek Latzer Baratz LLP

(57) ABSTRACT

A method and a system for photoacoustic inspection of a part are provided herein. The method may include the following steps: photo-acoustically exciting a predetermined position in a predetermined region on a part by pulsed laser illumination, to yield ultrasonic excitation of the part; coherently illuminating a predetermined location in the predetermined region on the part; detecting an illumination scattered from the predetermined location; determining, based on the scattered illumination, a plurality of sequence of two or more temporally-sequential de-focused speckle pattern images, wherein each of the sequences corresponds to one of the predetermined illuminated locations; and determining a set of translations, each determined based on the sequences, wherein each translation in the set is determined based on
(Continued)

two temporally-sequential speckle patterns images in the respective sequence.

20 Claims, 12 Drawing Sheets

(51) Int. Cl.
G01N 29/24 (2006.01)
G01N 21/88 (2006.01)
G01N 21/47 (2006.01)
G01H 9/00 (2006.01)

(52) U.S. Cl.
CPC ......... G01N 21/88 (2013.01); G01N 29/2418 (2013.01); G01N 2021/1706 (2013.01); G01N 2021/479 (2013.01); G01N 2201/0697 (2013.01); G01N 2201/06113 (2013.01); G01N 2291/0289 (2013.01)

(58) Field of Classification Search
CPC ................. G01H 9/002; G01H 9/008; G01N 2021/1706; G01N 2021/1708; G01N 2021/479; G01N 21/1702; G01N 2291/0289; G01N 29/043; G01N 29/2418
See application file for complete search history.

(56) References Cited

U.S. PATENT DOCUMENTS

| | | | |
|---|---|---|---|
| 5,212,667 A | 5/1993 | Tomlinson, Jr. et al. | |
| 5,301,003 A | 4/1994 | Ikeda | |
| 5,608,166 A | 3/1997 | Monchalin et al. | |
| 6,008,887 A | 12/1999 | Klein et al. | |
| 7,088,455 B1 | 8/2006 | Kirkpatrick et al. | |
| 7,262,861 B1* | 8/2007 | Pepper | G01B 11/06 356/502 |
| 9,506,742 B2 | 11/2016 | Horstmann et al. | |
| 9,964,747 B2 | 5/2018 | Ntziachristos et al. | |
| 2005/0210982 A1* | 9/2005 | Pepper | G01H 9/00 73/602 |
| 2005/0210985 A1* | 9/2005 | Pepper | G01H 9/00 73/643 |
| 2008/0291465 A1 | 11/2008 | Lorraine et al. | |
| 2010/0226543 A1 | 9/2010 | Zaievsky | |
| 2012/0200845 A1 | 8/2012 | Rousseau et al. | |
| 2013/0160557 A1 | 6/2013 | Nakajima | |
| 2014/0116146 A1 | 5/2014 | Bossi et al. | |
| 2014/0247456 A1 | 9/2014 | Horstmann et al. | |
| 2017/0258332 A1 | 9/2017 | Wynn | |
| 2017/0323132 A1 | 11/2017 | Lu | |
| 2018/0283847 A1* | 10/2018 | Hatahori | G01M 7/025 |
| 2020/0371018 A1 | 11/2020 | Leizerson et al. | |

FOREIGN PATENT DOCUMENTS

| | | | |
|---|---|---|---|
| WO | WO-2018150422 A1 * | 8/2018 | .......... A61B 5/0261 |
| WO | WO-2019/030751 A1 | 2/2019 | |
| WO | WO-2019030751 A1 * | 2/2019 | ............. G01H 9/008 |

OTHER PUBLICATIONS

Office Action for U.S. Appl. No. 17/137,393, dated Mar. 18, 2021.
Van Oepen et al., "Characterization of an Electronic Speckle Pattern Detection System"; Student Conference Medical Engineering Science 2013, Proceedings. vol. 2, p. 51, GRIN Verlag, 2013, Retrieved from https://www.bmo.uni-luebeck.de/uploads/tx_wapublications/.
Jens Horstmann et al., "Non-contact Photoacoustic Tomography using holographic full field detection"; European Conference on Biomedical Optics, Proc. SPIE, vol. 8800, pp. 880007-880007-6 (2013).
C. Buj et al., "Speckle-based off-axis holographic detection for non-contact photoacoustic tomography"; Biomedical Engineering, Sep. 2015; vol. 1, pp. 356-360.
Office Action for Israel Patent Application No. 253862, dated Aug. 2, 2018.
International Search Report and Written Opinion for PCT Application No. PCT/IL2018/050867, dated Dec. 13, 2018.
Notice of Allowance for U.S. Appl. No. 17/137,393, dated Sep. 23, 2021.

* cited by examiner

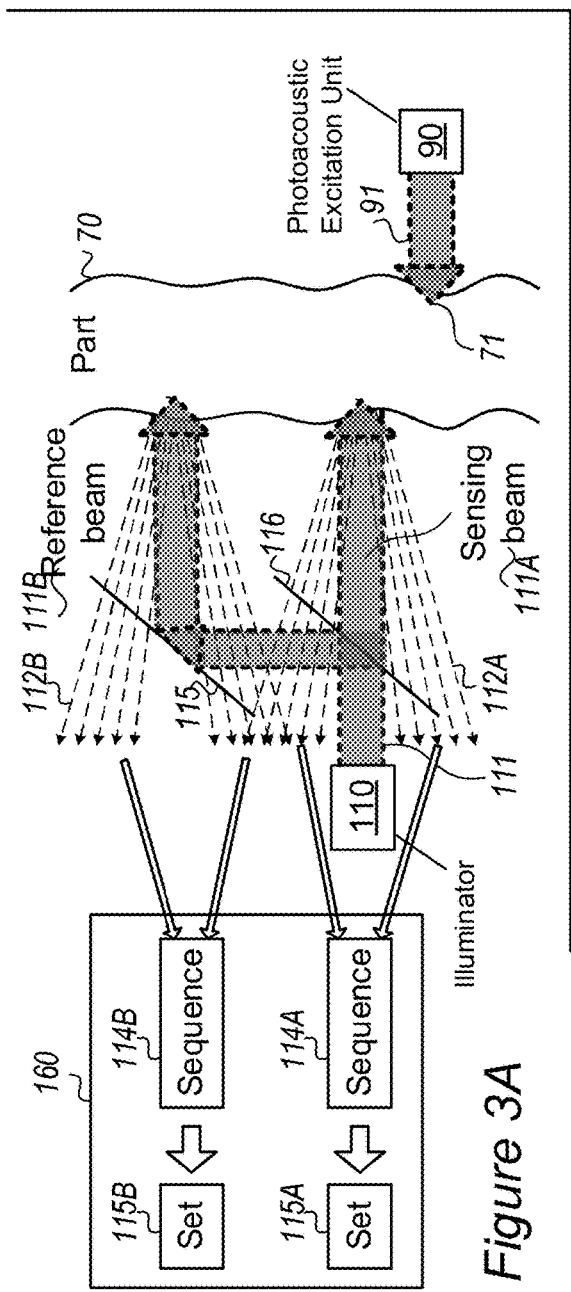
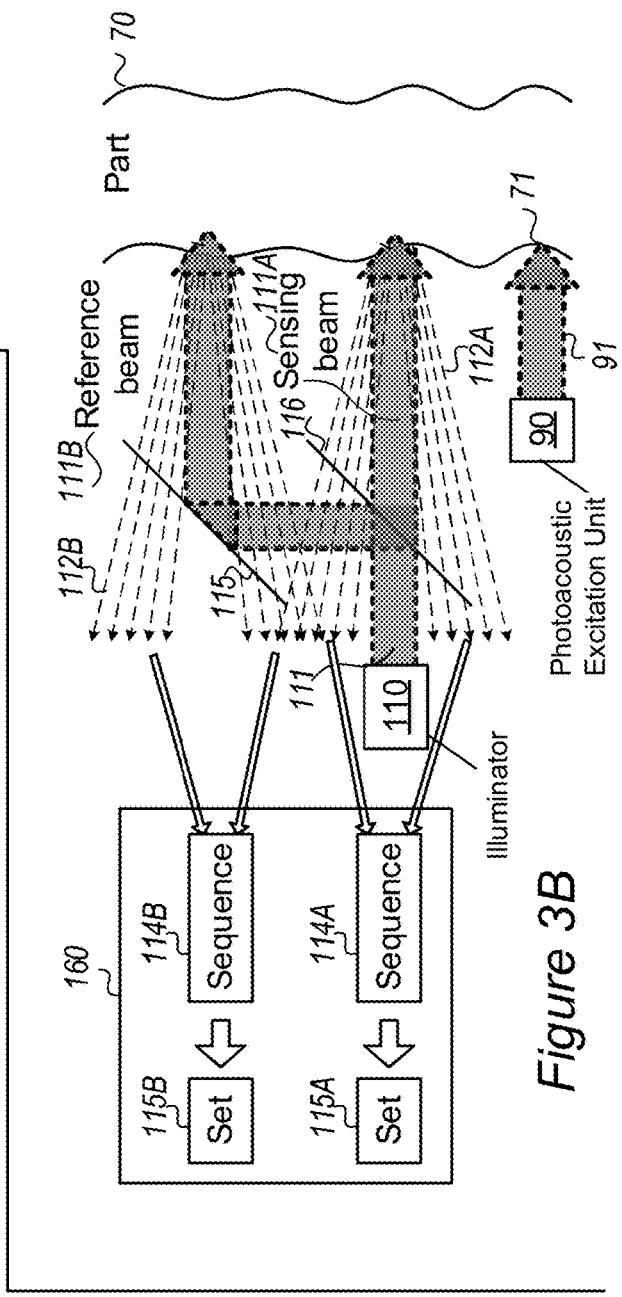
Figure 3A
Figure 3B

114

Speckle pattern image obtained form reflected reference beam 112B

Speckle pattern image obtained form reflected sensing beam 112A

PHOTOACOUSTIC EXCITATION SENSING ENHANCED BY CROSS-CORRELATED UNFOCUSED SPECKLE IMAGES

CROSS-REFERENCE TO RELATED APPLICATIONS

This application is a National Phase Application of PCT international Application No. PCT/IL2018/050867, International Filing Date Aug. 6, 2018, entitled: "PHOTOACOUSTIC EXCITATION SENSING ENHANCED BY CROSS-CORRELATED UNFOCUSED SPECKLE IMAGES", Published on Feb. 14, 2019 under PCT International Application Publication No. WO 2019/030751 which claims the priority of Israel Patent Application No. 253862, filed Aug. 6, 2017, which is hereby incorporated by reference in its entirety.

TECHNICAL FIELD OF THE INVENTION

The present invention relates to the field of part inspection system and methods, and more particularly, to photoacoustic excitation inspection methodologies.

BACKGROUND OF THE INVENTION

Photoacoustic effect or optoacoustic effect is the formation of sound waves following light absorption in a material sample or a part under test. The photoacoustic effect is achieved by varying the light intensity, either periodically (modulated light) or as a single flash (pulsed light).

In methods known in the art, the photoacoustic effect may be quantified by measuring the formed sound (pressure changes) with appropriate detectors, such as microphones or piezoelectric sensors. The time variation of the electric output (current or voltage) from these detectors is the photoacoustic signal. These measurements are useful to determine certain properties of the studied sample. For example, in photoacoustic spectroscopy, the photoacoustic signal is used to obtain the actual absorption of light in either opaque or transparent objects.

Photoacoustic excitation is also a known method of inspecting parts, which, while being non-destructive and not requiring direct contact. Photoacoustic excitation however, is highly sensitive to noise and disturbances.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an inspection system comprising: a photoacoustic excitation unit comprising at least one pulsed laser source configured to illuminate at least one predetermined position on a part and generate thereby ultrasonic excitation of the part; a coherent illuminator configured to illuminate at least one predetermined location on the part with coherent illumination; an optical unit in association with a detector, wherein the optical unit is configured to gather an illumination scattered from the at least one predetermined location to the detector, and wherein the detector is configured to generate, based on the scattered illumination, at least one sequence, wherein each of the at least one sequence comprising at least two temporally-sequential de-focused speckle pattern images of one of the at least one predetermined illuminated location; and an image analysis unit configured to: receive the at least one sequence; and to determine at least one set of translations, each of the at least one set is determined based on one of the at least one sequence, wherein each translation in each of the at least one set is determined based on two temporally-sequential speckle patterns images in the respective sequence.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A and 3B are high level schematic illustrations of inspection system in which a coherent illumination beam is split into a sensing beam and a reference beam, according to some embodiments of the invention;

DETAILED DESCRIPTION OF THE INVENTION

Figure 1:
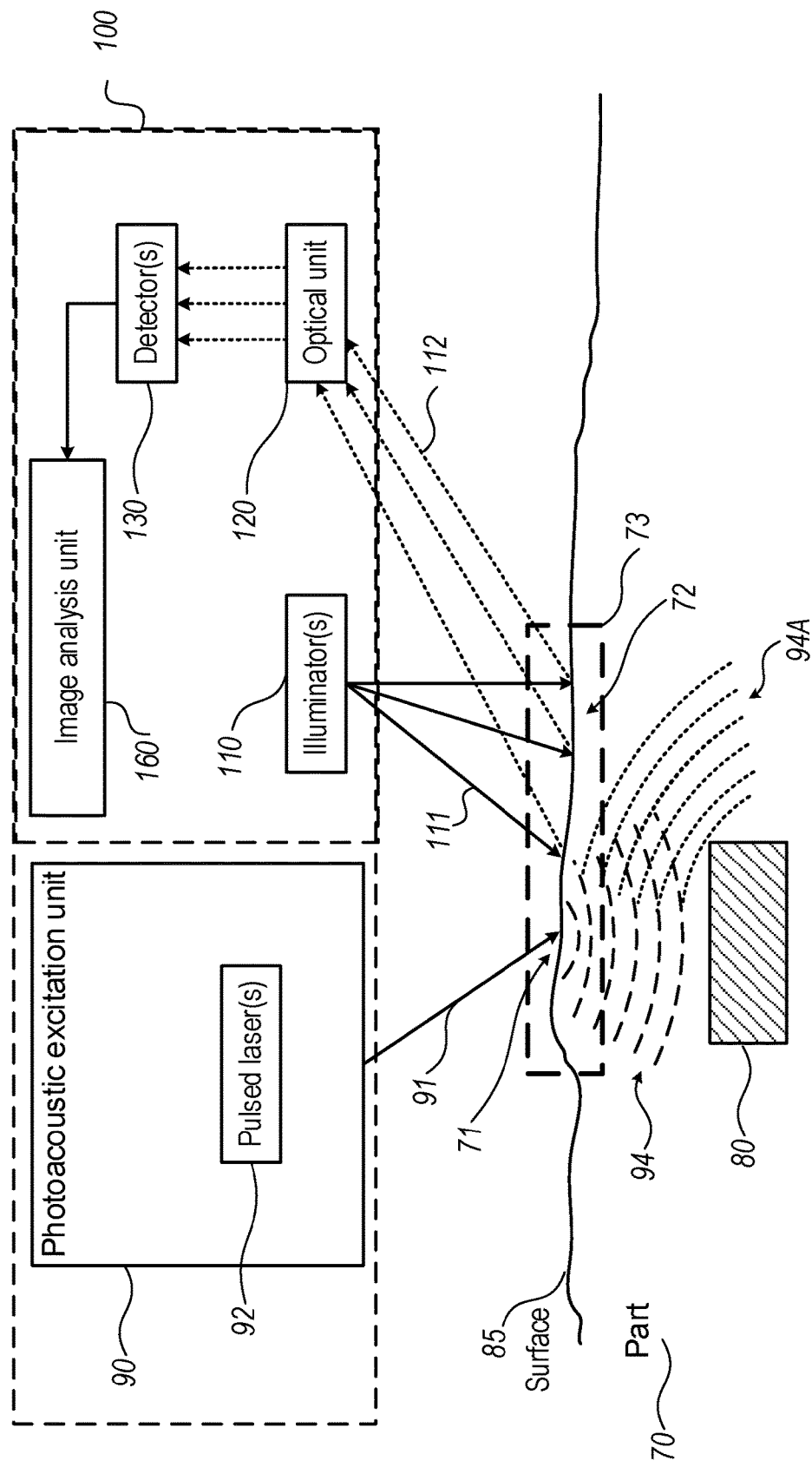
FIG. 1 is a high level schematic illustration of inspection system, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Inspection systems and methods are provided, which use a photoacoustic excitation unit to illuminate at least one predetermined position on a part with pulsed laser and generate thereby ultrasonic excitation of the part. Inspection systems include a coherent illuminator configured to illuminate at least one predetermined location on the part with coherent illumination, an optical unit in association with a detector, wherein the optical unit is configured to gather an illumination scattered (or reflected) from the predetermined location to the detector, and wherein the detector is configured to generate, based on the scattered illumination, at least one sequence, wherein each of the at least one sequence comprising at least two temporally-sequential de-focused speckle pattern images of one of the at least one predetermined illuminated location; and an image analysis unit configured to receive the at least one sequence and to determine at least one set of translations, each of the at least one set is determined based on one of the at least one sequence, wherein each translation in each of the at least one set is determined based on two temporally-sequential speckle patterns images in the respective sequence. In some embodiments, the image analysis unit may be further configured to determine, based on the at least one set of translations, an angular distortion of the at least one predetermined location within the part and further determine, based on the angular distortion of the at least one predetermined location, an intensity pattern of the ultrasonic excitation propagating through the at least one predetermined location. Detection may be carried out using multiple narrow beams that illuminate different locations which are distinguished on the detector or using a wide beam and analyzing parts of the whole detected speckle pattern images which correspond to the different locations on the part. Disclosed systems and methods enable reliable and efficient operation in noisy environments and particularly outdoors, and thus expand the usability of the disclosed method to a wide range of part inspection scenarios. Disclosed inspection methods and systems may for example be used for inspecting aircraft parts, possibly outdoors, during construction as well as during the lifetime of the aircraft. Moreover, the disclosed inspection methods and systems may be adapted to inspection direction and location with respect to the part. Disclosed systems may include a scanning procedure in illumination and/or detection arm to allow investigation of large areas.

FIG. 1 is a high level schematic illustration of inspection system 100, according to some embodiments of the invention. Inspection systems 100 may include a photoacoustic excitation unit 90 comprising at least one pulsed laser source 92 configured to illuminate at least one excitation beam 91 onto at least one predetermined position 71 positioned within a predetermined region 73 on a surface 85 of part 70 and generate thereby ultrasonic excitation 94 of part 70. Inspection systems 100 include at least one coherent illuminator 110 configured to illuminate at least one predetermined location 72 positioned in predetermined region 73 on surface 85 of part 70 with coherent illumination, possibly but not necessarily close to predetermined position(s) 71 illuminated by pulsed laser source(s) 92.

Inspection systems 100 may further include a detector 130 in association with an optical unit 120. Optical unit 120 may configured to gather an illumination 112 scattered (or reflected) from predetermined location(s) 72 to detector 130. Detector 130 may be configured to generate, based on scattered illumination 112, at least one sequence 114, where each of sequence(s) 114 may include at least two temporally-sequential de-focused speckle pattern images of one of predetermined illuminated location(s) 72. In some embodiments, detector 130 may be, for example, a camera. Alternatively or complementarily, detector 130 may be, for example, a single pixel detector configured to determine translation of speckle pattern images across the pixel thereof.

Inspection systems 100 may further include an image analysis unit 160. Image analysis unit 160 may be configured to receive sequence(s) 114 and to determine, for each of sequence(s) 114, corresponding set 115 of speckle pattern images translations. Each translation in each of set(s) 115 may be determined based on two temporally-sequential speckle patterns images in the respective sequence 114, and may include, for example, an information regarding a measure of similarity of the two temporally-sequential speckle patterns images thereof as a function of the displacement of one relative to the other. In some embodiments, each of translations thereof may be determined using, for example a cross-correlation between two temporally-sequential speckle patterns images. Alternatively or complementarily, the translations of the speckle pattern images may be determined by applying, for example, at least one of a feature based registration, machine learning algorithm or other image registration technique on the sequence of the speckle pattern images thereof.

In some embodiments, imaging analysis modulus 160 may be further configured to determine, for example, an angular distortion of respective illuminated location 72 based on each of set(s) 115 (e.g., using a cross-correlation between sequential translations in each of the sets thereof), and further to determine, for example, an intensity pattern of ultrasonic excitation 94 propagating through respective illuminated location 72 based on the angular distortion thereof. In some embodiments, the angular distortion $\Delta\varphi$ may be based on, for example, translation $\Delta s$ of the speckle pattern across detector 130, a distance Z from the object to a predetermined imaging position (e.g., as a position of an object that provides an image having a predetermined sharpness), and a magnification M of the optical system. For example, Equation 1 shows the angular distortion $\Delta\varphi$ as follows:

$$\Delta\varphi = \Delta s / 2ZM \qquad \text{(Equation 1)}$$

In some embodiments, ultrasonic excitation 94 (e.g., induced by excitation beam 91) may be affected by at least one zone 80 within part 70 to provide modified ultrasonic excitation 94A (e.g., as shown in FIG. 1). Accordingly, in various embodiments of the invention, data concerning ultrasonic excitation 94 (e.g., the intensity pattern of ultrasonic excitation 94) and/or data concerning modified ultrasonic excitation 94A (e.g., the intensity pattern of modified ultrasonic excitation 94A) may be used to further identify zone(s) 80 in part 70. Zone(s) 80 may be, for example, cracks, inhomogeneities, various inclusions and/or defects in part 70 etc. The schematic illustration of zone(s) 80 as having a volume is non-limiting, and zone 80 may well be a crack or a material inhomogeneity as well.

In some embodiments, imaging analysis unit 160 may be further configured to compare at least two sets 115 of translations (e.g., where each of sets 115 corresponds to a different predetermined locations 71) and to determine, based on the comparison thereof, a whole-body movement of predetermined location(s) 71 of part 70 (e.g., translational movements, rotational movements and/or vibrations of predetermined location(s) 71), while isolating and/or distinguishing the whole body movement from ultrasonic excitation 94 (and/or modified ultrasonic excitation 94A) of predetermined location(s) 71 (e.g., as some of predetermined locations 71 may be affected by both whole-body movement and ultrasonic excitation of part 70 while others may be affected by whole-body movements only).

Figure 2A:
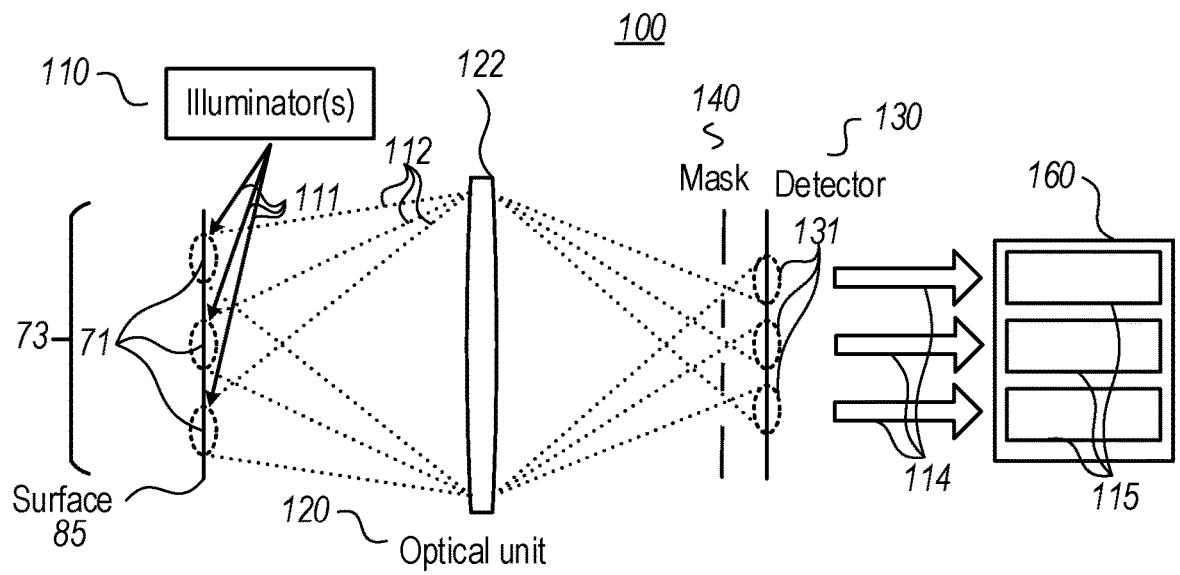
FIG. 2A is a high level schematic illustration of inspection system comprising coherent illuminator configured to illuminate multiple predetermined locations on part with multiple narrow beams, according to some embodiments of the invention.

FIG. 2A is a high level schematic illustration of inspection system 100 comprising coherent illuminator 110 configured to illuminate multiple predetermined locations 71 on part 70 with multiple narrow beams 111, according to some embodiments of the invention.

In some embodiments, coherent illuminator 110 may be configured to illuminate multiple predetermined locations 71 within predetermined region 73 with multiple narrow beams 111, as illustrated in a non-limiting manner in FIG. 2A. Optical unit 120 (e.g., a lens 122) may include a mask 140 at a focusing plane of optical unit 120. Mask 140 may be configured to gather each scattered (or reflected) beam of multiple scattered beams 112 to a predetermined region of multiple predetermined regions 131 on detector 130. Mask 140 may be further configured to avoid a crosstalk between multiple beams 112 scattered from different predetermined locations 71. For example, for a two-dimensional (2D) array of light spots (e.g., predetermined illuminated locations 71), mask 140 may be configured to include a corresponding 2D array of holes in corresponding positions on the mask thereof. Detector 130 may be configured to generate multiple sequences 114 of temporally-sequential speckle pattern images based on multiple scattered beams 112 detected in multiple regions 131, where each sequence of multiple sequences 114 may correspond to one predetermined location of multiple predetermined locations 71 on part 70 (e.g., as shown in FIG. 2A). Image analysis unit 160 may be configured to determine multiple sets 115 of translations based on multiple sequences 114 of speckle pattern images, where each of sets 115 may correspond to one of sequences 114 (e.g., as shown in FIG. 2A). In some embodiments, imaging analysis unit 160 may be further configured to compare multiple sets 115 of translations (e.g., where each of sets 115 corresponds to one of sequences 114 and to one of predetermined locations 71, respectively) and to determine, based on the comparison thereof, a whole-body movement of predetermined location(s) 71 of part 70 (e.g., translational movements, rotational movements and/or vibrations of predetermined location(s) 71), while isolating and/or distinguishing the whole-body movement from ultrasonic excitation 94 (and/or modified ultrasonic excitation 94A) of predetermined location(s) 71 (e.g., as some of predetermined locations 71 may be affected by both whole-body movement and ultrasonic excitation of part 70 while others may be affected by whole-body movements only).

Figure 2B:
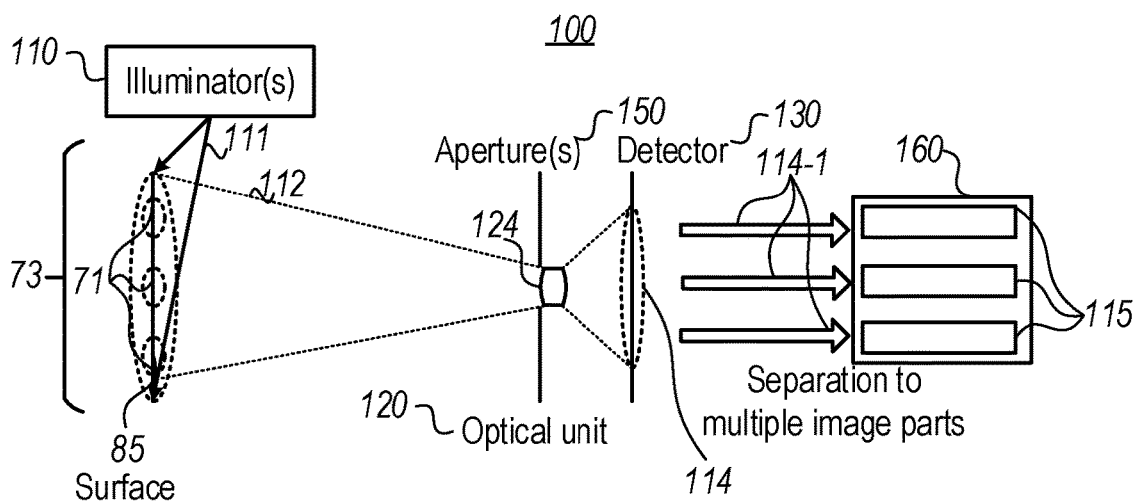
FIG. 2B is a high level schematic illustration of inspection system comprising coherent illuminator configured to illuminate multiple predetermined locations on part with a single wide beam, according to some embodiments of the invention.

FIG. 2B is a high level schematic illustration of inspection system 100 comprising coherent illuminator 110 configured to illuminate multiple predetermined locations 71 on part 70 with a single wide beam 111, according to some embodiments of the invention.

In some embodiments, coherent illuminator 110 may be configured to illuminate multiple predetermined locations 71 in predetermined region 73 with a single wide beam 111, as illustrated in a non-limiting manner in FIG. 2B. Optical unit 120 may further include an aperture 150 in front of detector 130 (possibly accompanied by optical element(s) such as a lens 124). Aperture 150 may be configured to increase a f-number of optical unit 120 to, for example, enable diminishing a crosstalk between multiple predetermined locations 71 on surface 85 of part 70, such that single sequence 114 of temporally-sequential speckle pattern images will be generated, where each of the speckle pattern images in the sequence 114 includes data regarding all multiple predetermined locations 71 in predetermined region 73 illuminated by single wide beam 111. In some embodiments, each of the speckle pattern images in the sequence 114 may include multiple image parts 114-1, where each image part of multiple image parts 114-1 may correspond to one of multiple predetermined locations 71 on part 70. The image parts thereof may be processed (e.g., as described above with respect to FIG. 1 and FIG. 2A) separately to provide multiple sets 115 of translations (e.g., where each of sets 115 corresponds to one predetermined location of multiple predetermined locations 71). Image analysis unit 160 may be further configured to determine a whole-body movement of predetermined location(s) 71 of part 70 (e.g., based on multiple sets 115 thereof), and distinguish them from ultrasonic excitation 94 (or modified ultrasonic excitation 94A), for example, as described above with respect to FIG. 2A.

In some embodiments, coherent illuminator 110 may be configured to illuminate multiple locations by a single beam which is scanned between the locations (indicated in FIG. 1 schematically by arrow 111 indicating an optional scanning), possibly to cover a designated area on part 70. Scanning 111 may be implemented to any of the disclosed wide and/or narrow beams (e.g., as described above with respect to FIG. 2B and FIG. 2A, respectively).

In some embodiments, inspection system 100 may be configured to operate outdoors, or possibly indoors, and/or under noisy conditions. The ability of inspection system 100 and image analysis unit 160 to separate whole-body movements of part 70 (or of predetermined location(s) 71 of part 70) from ultrasonic excitation 94 (or modified ultrasonic excitation 94A) of part 70, was found to make inspection system 100 efficient and versatile inspection system.

FIGS. 3A-3B are high level schematic illustrations of inspection system 100 in which a coherent illumination beam 111 is split into a sensing beam 111A and a reference beam 111B, according to some embodiments of the invention.

In various embodiments, the whole-body movement of part 70 (or predetermined location(s) 71 of part 70) and/or beam spatial wandering may be determined and distinguished from ultrasonic excitation 94 (or modified ultrasonic excitation 94A) by, for example, splitting coherent illuminator beam 111 into, for example, two beams, indicated as a sensing beam 111A and a reference beam 111B in FIG. 3A and FIG. 3B. The splitting may be carried out by any optical element(s) 115, for example, beam splitters (e.g., as shown in FIGS. 3A-3B).

In some embodiments, sensing beam 111A may be configured to be close to photoacoustic excitation beam 91 (e.g., as shown in FIG. 3A-3B) to determine set 115A of translations derived from sequence 114A of speckle pattern images based on scattered sensing beam 112A affected both by the whole-body movement and by ultrasonic excitation 94 (or modified ultrasonic excitation 94A) induced by excitation beam 91. Reference beam 111B may be configured to be far from excitation beam 91 (e.g., as shown in FIG. 3A-3B), to determine set 115B of translations derived from sequence 114B of speckle pattern images based on scattered reference beam 112B affected by the whole-body movement of part 70 and not by ultrasonic excitation 94 (or modified ultrasonic excitation 94A). Imaging analysis unit 160 may be further configured to determine and/or distinguish, based on sets 115A and 115B, the whole-body movement of part 70 and the data related to the ultrasonic excitation 94 (e.g., intensity patterns) or modified ultrasonic excitation 94A (e.g., as described below with respect to FIGS. 3D-3E).

It is noted that this approach may be applied to either or both cases of illumination 111 at an opposite side of part 70 with respect to excitation 91 and illumination 111 at the same side of part 70 with respect to excitation 91, as illustrated schematically in FIG. 3A and FIG. 3B, respectively.

Figure 3C:
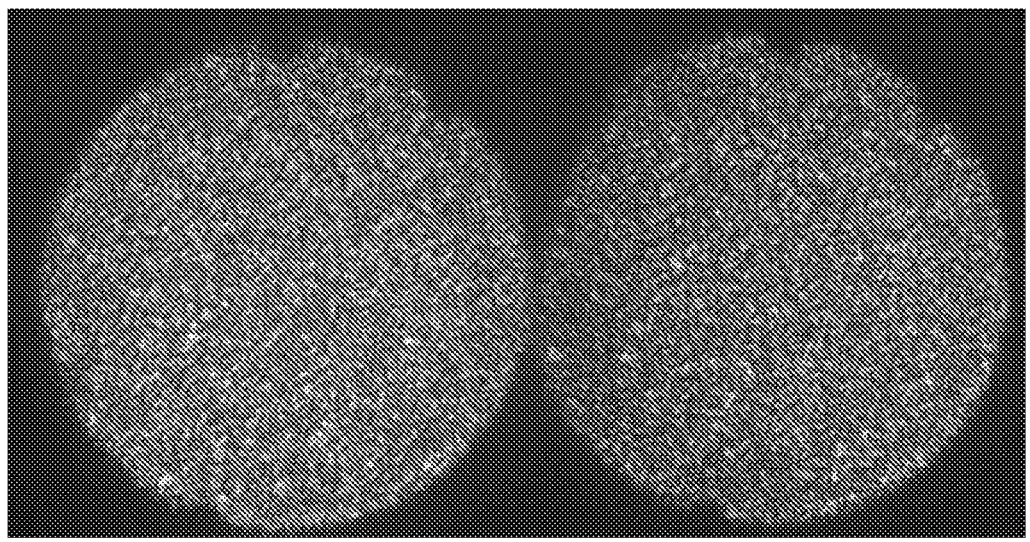
FIG. 3C is an example for speckle patterns images received from scattered sensing beam and scattered reference beam, in a non-limiting example, according to some embodiments of the invention.

FIG. 3C is an example for speckle patterns images received from scattered sensing beam 112A and scattered reference beam 112B, in a non-limiting example, according to some embodiments of the invention.

Figure 3D:
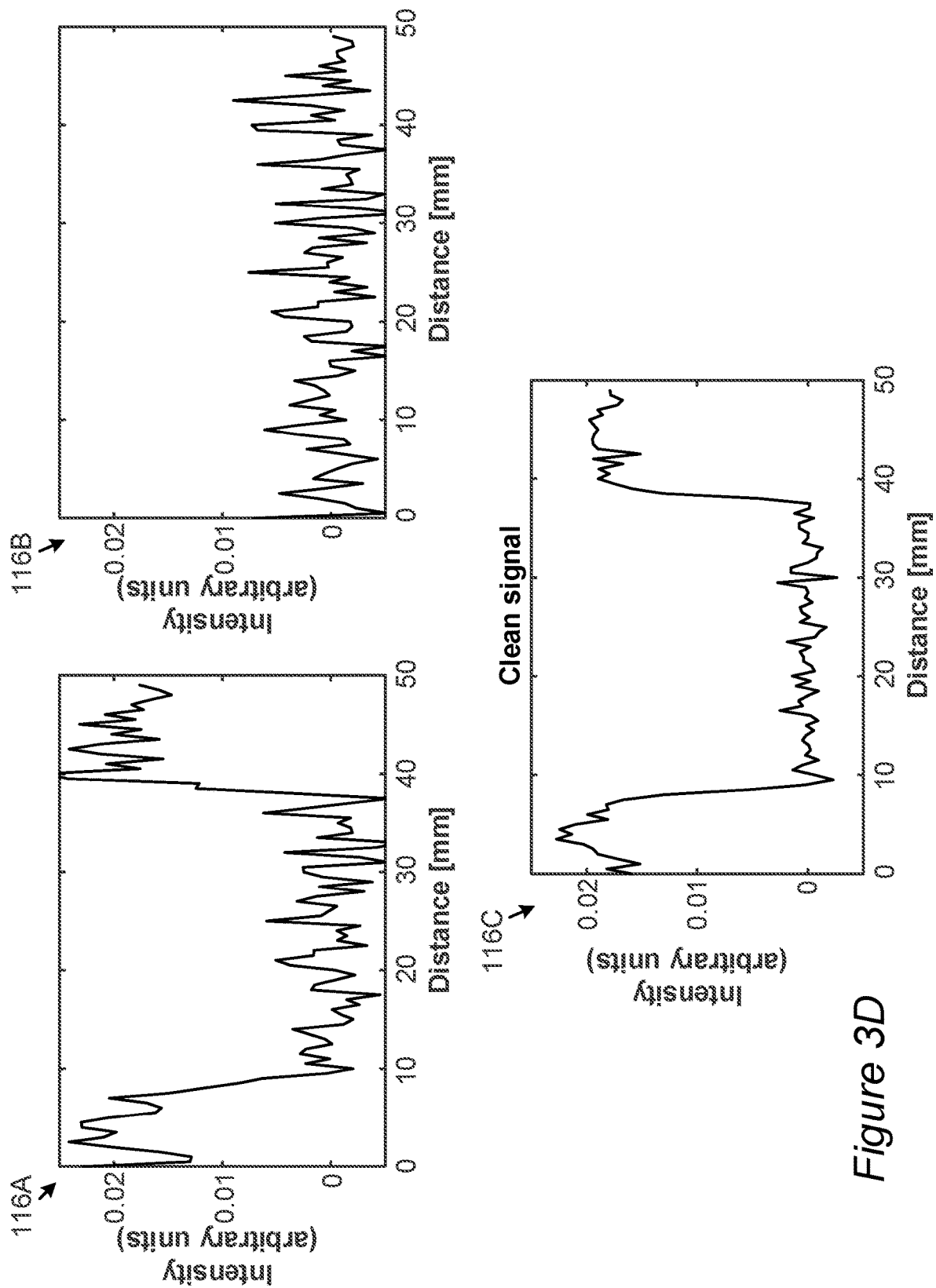
FIGS. 3D and 3E are examples for the determination of intensity patterns of ultrasonic excitation and modified ultrasonic excitation by an inspection system, according to some embodiments of the invention.
Figure 3E:
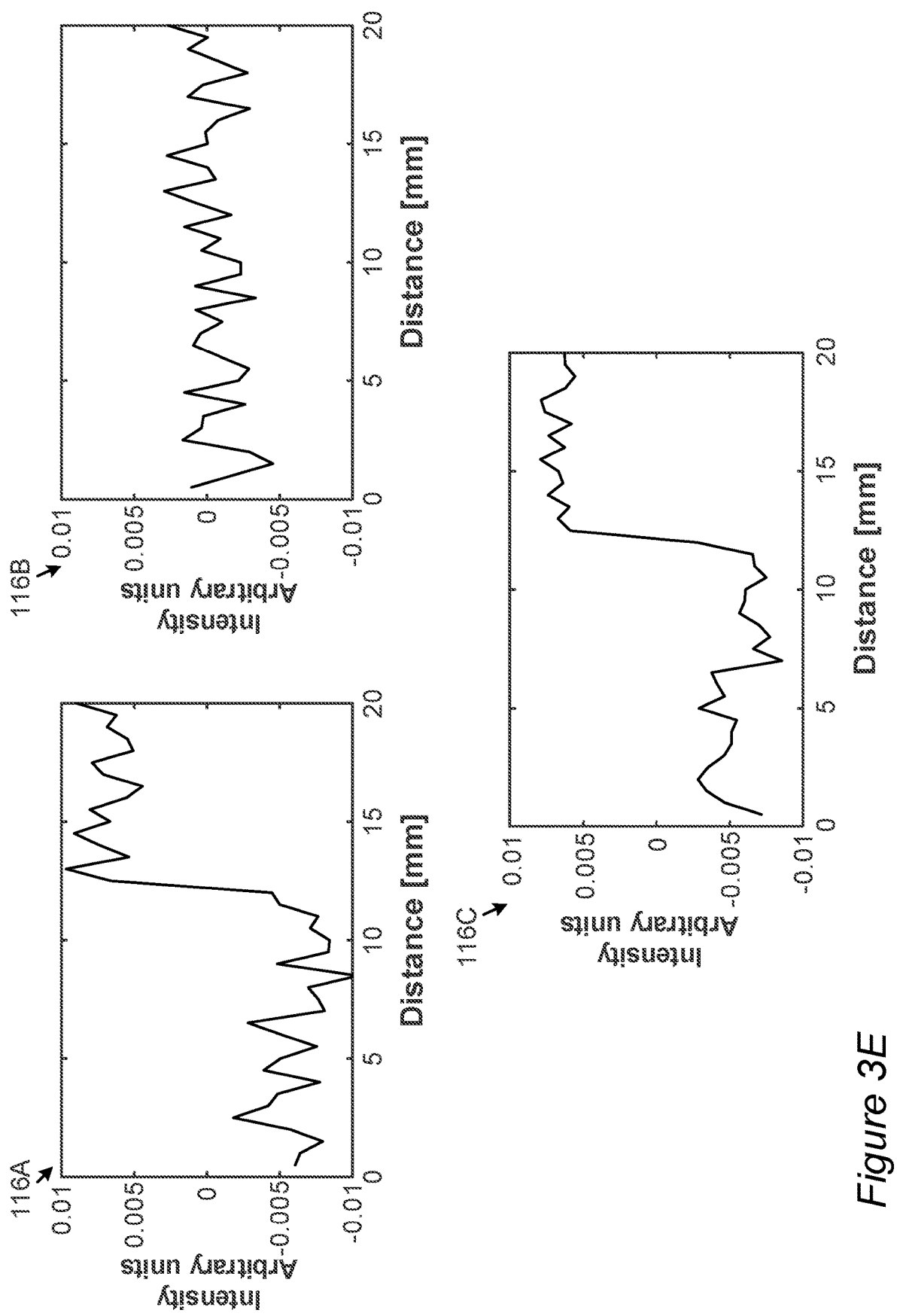

FIGS. 3D and 3E are examples for the determination of intensity patterns of ultrasonic excitation 94 and modified ultrasonic excitation 94A by an inspection system 100, according to some embodiments of the invention.

Image analysis unit 160 of inspection system 100 may be configured to determine signals 116A and 116B based on sets 115A and 115B of translations, respectively, which are determined based on sequences 114A and 114B of temporally-subsequent speckle patterns images received from sensing beam 111A and reference beam 112A, respectively (e.g., as described above with respect to FIGS. 3A-3B). Signals 116A and 116B may be determined based on sets 115A and 115B of translations, respectively (e.g., using cross-correlation between sequential translations in the sets thereof). Image analysis unit 160 may be further configured to determine a signal 116C (e.g., based on signals 116A and 116B) that may include, for example, information regarding zone(s) 80 in part 70 (e.g., as described above with respect to FIG. 1). For example, subtracting signal 116B (e.g., determined based on scattered reference beam 112B) from signal 116A (e.g., determined based on scattered sensing beam signal 112A) may provide signal 116B cleaned from noise and/or from whole-body movement disturbances (such as originating from whole object vibration, sensing beam spatial wandering and other noise sources).

FIG. 3D illustrates signals 116A, 116B and 116C determined based on sequence 114 of temporally-sequential speckle patterns images obtained from predetermined region 73 over a 50 mm long line on surface 85 of sampled part 70, when excitation and illumination are from opposite sides (e.g., as shown in FIG. 3A). From signal 116C, a central, ca. 30 mm wide region (between ca. 10 mm and 40 mm on the x axis) indicates a defect (as zone 80) in part 70 which causes a decrease in the signal amplitude. It is noted that the clean signal provides a better indication of defect 80 than the original signal.

FIG. 3E illustrates signals 116A, 116B and 116C determined based on sequence 114 of temporally-sequential speckle patterns images obtained from predetermined region 73 over a 50 mm long line on surface 85 of sampled part 70, when excitation and illumination are from the same side (e.g., as shown in FIG. 3B). From signal 116C, a transition (at ca. 12 mm on the x axis) indicates an edge of defect 80 in part 70 which causes an increase in the signal amplitude (defect 80 on the right-hand side of the diagram). It is noted that the clean signal provides a better indication of defect 80 than the original signal.

Figure 4A:
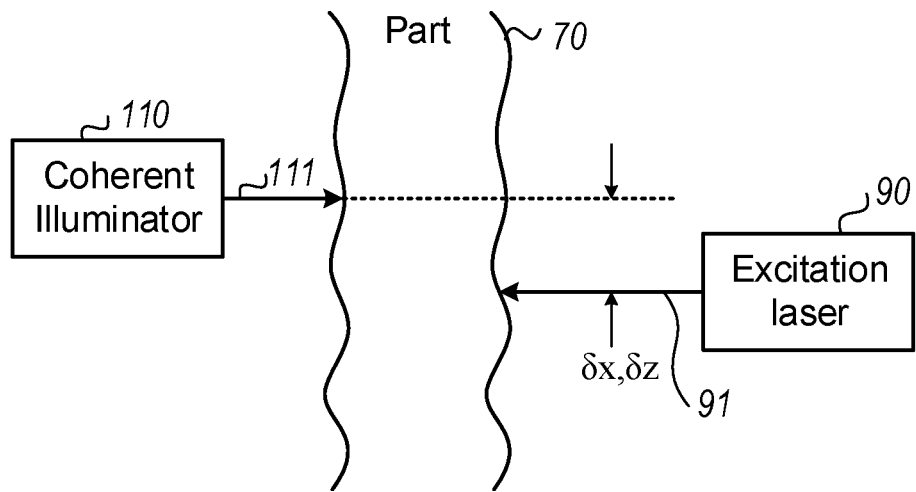
FIGS. 4A and 4B are high level schematic illustrations of lateral shifts between excitation beam and illumination beam in different configurations, according to some embodiments of the invention.
Figure 4B:
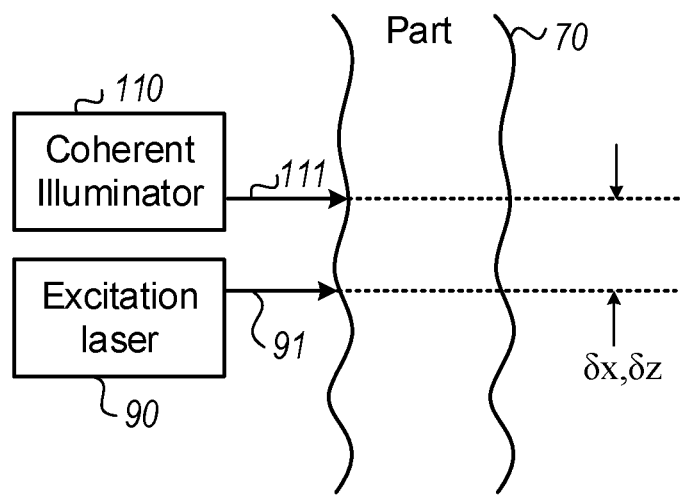

FIGS. 4A and 4B are high level schematic illustrations of lateral shifts between excitation beam 91 and illumination beam 111 in different configurations, according to some embodiments of the invention. It is noted that the lateral shifts may be measured either or both cases of illumination 111 at an opposite side of part 70 with respect to excitation 91 and illumination 111 at the same side of part 70 with respect to excitation 91, as illustrated schematically in FIGS. 4A and 4B, respectively. The lateral shift, denoted schematically as δx, δz (e.g., δx for the shift in the plane of the page, δz for the shift orthogonal to the plane of the page), between photoacoustic excitation beam 91 and coherent illuminator beam 111 may be determined and controlled by inspection system 100. For example, an optimal shift between excitation and sensing beams 91, 111 (respectively) may be set to provide the maximal signal of translation derived from correlation between speckle patterns 114.

Figure 4C:
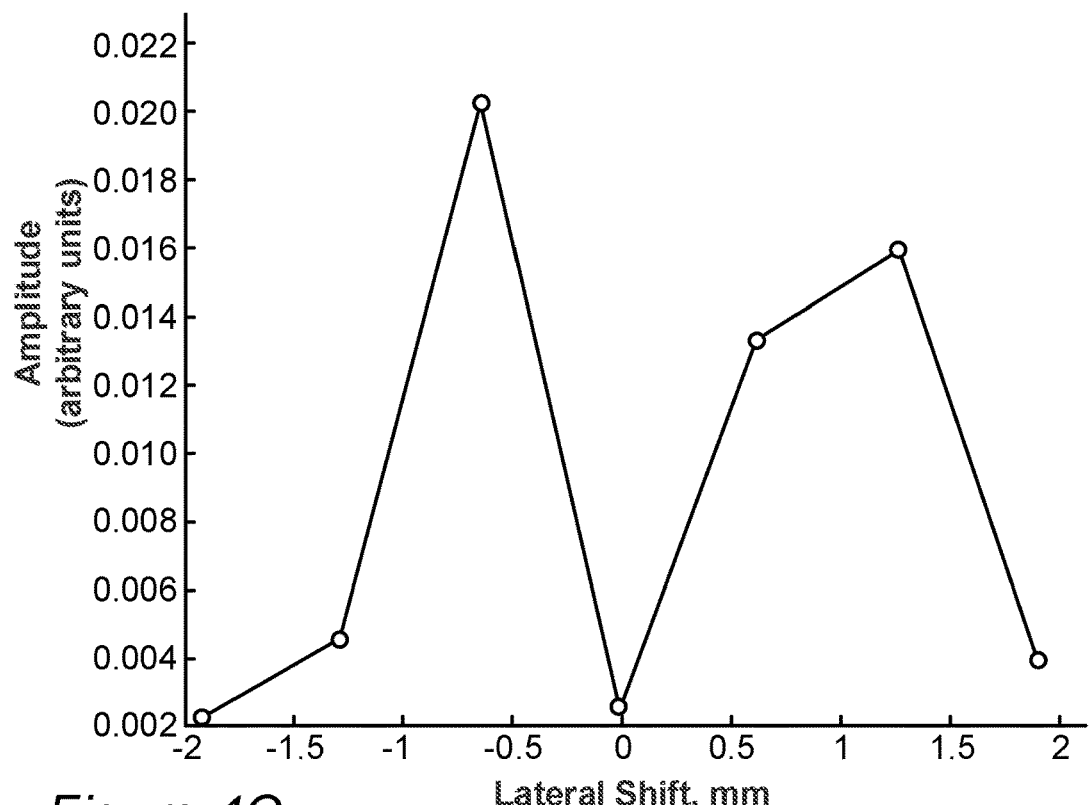
FIG. 4C is an example for simulation result concerning the dependency of an amplitude of signal, determined based on scattered sensing beam, on the lateral shift between excitation beam and illumination beam, according to some embodiments of the invention.

FIG. 4C is an example for simulation result concerning the dependency of an amplitude of signal 116A (determined based on scattered sensing beam 112A) on the lateral shift between excitation beam 91 and illumination beam 111, with part 70 having a thickness of 3 mm without a defect 80 when excitation and illumination are from opposite sides, according to some embodiments of the invention. The derived dependency may be used to determine the optimal shift for the relative positioning of beams 91, 111. As illustrated schematically in the non-limiting example of FIG. 4C, a zero-lateral shift (overlapping beams 91, 111) may cause the signal to be negligible, while other values of the lateral shift (e.g., ca. −0.5 mm, ca 1 mm) provide a significant signal.

Figure 4D:
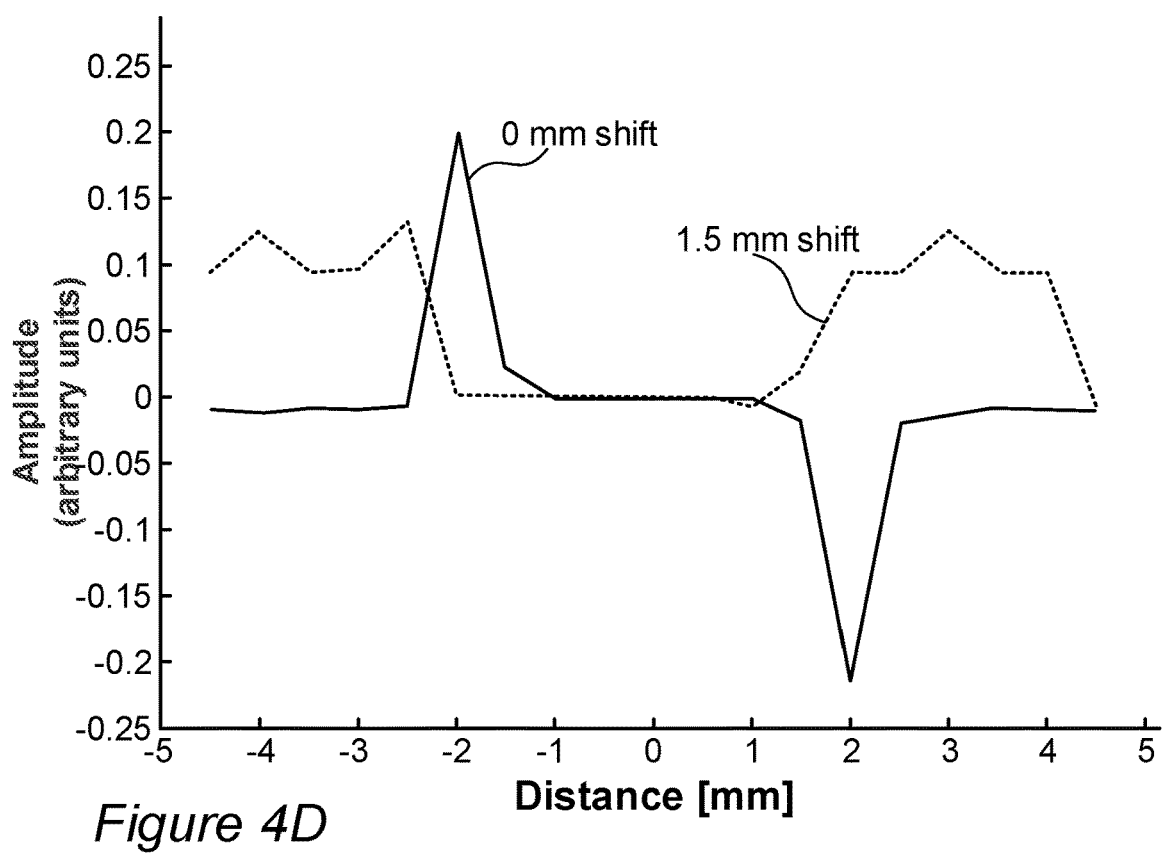
FIG. 4D is an example for simulation result concerning a 10 mm long line on the surface, with part having a 4 mm wide inner defect, according to some embodiments of the invention.

FIG. 4D is an example for simulation result concerning a 10 mm long line on the surface, with part 70 having a 4 mm wide inner defect 80 and with excitation beam 91 having a 0.1 μsec width pulses, according to some embodiments of the invention. FIG. 4D illustrates the dependency of an amplitude of signal 116A, determined based on scattered sensing beam 112A, on the lateral shift between excitation beam 91 and illumination beam 111. The optimal shift between excitation and illuminator beams 91, 111, respectively, in the illustrated non-limiting case is about 1.5 mm, to maximally enhance the defect in signal 116A. The resulting signal shape, illustrated in FIG. 4D by the 1.5 mm shift line, indicates defect 80 and may resemble the clean signal illustrated in FIG. 3D. It is noted that when the lateral shift is 0 mm, the signal is negligible except when the excitation and sensing beams are right over the defect edges, and therefore such configurations may be used specifically to detect defect edges—as illustrated by the two peaks in FIG. 4D (at −2 mm and +2 mm) for the 0 mm shift.

In some embodiments, the optimal lateral shift (e.g., at which the maximal signal 116A is obtained) may depend on a depth of zone(s) 80 within part 70. Accordingly, in some embodiments, the optimal lateral shift may be set to enable a detection of a desired zone 80 (e.g., a crack) in a desired depth range and may be further optimized to improve the resolution of the detection (e.g., to determine dimensions of zone 80).

Figure 5:
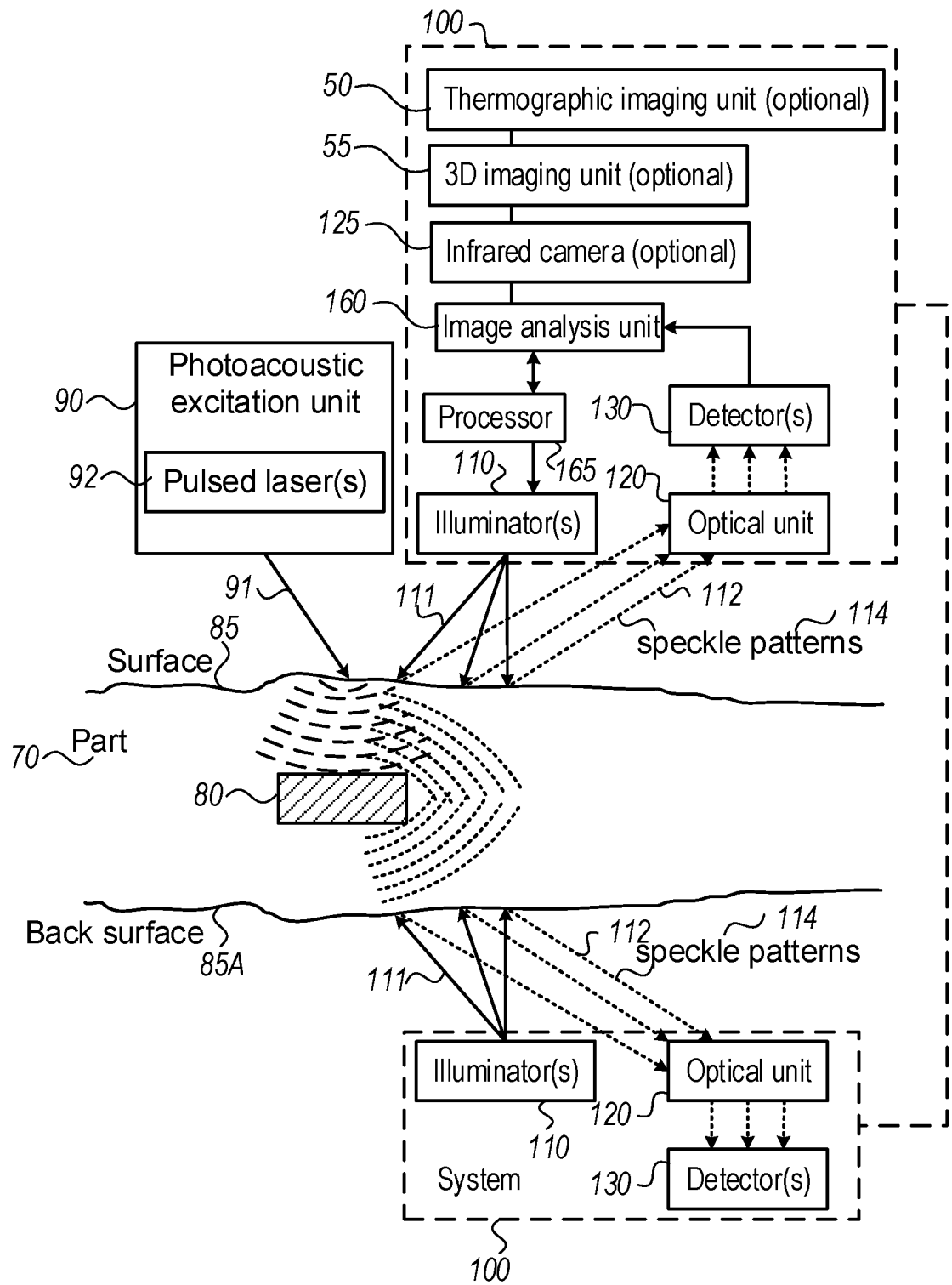
FIG. 5 is another high level schematic illustration of inspection system, according to some embodiments of the invention.

FIG. 5 is a high level schematic illustration of inspection systems 100, according to some embodiments of the invention. It is noted that elements from FIGS. 1, 2, 3A, 3B, 4A, 4B and 5 may be combined in any operable combination, and all possible combinations are comprised therefore in the present invention.

In some embodiments, inspection system 100 may be configured to operate with respect to opposite sides of flat part 70, as illustrated schematically in FIG. 5.

One or more computer processor(s) 165 may be part of system 100 and be configured to control the operation of system 100 and/or support the image processing, analysis and data fusion in system 100. Inspection system 100 may be configured to use the data concerning the ultrasonic excitation 94 or modified ultrasonic excitation 94A (e.g., intensity patterns) of part 70 (or predetermined locations 71 of part 70) to evaluate the propagation of the ultrasonic waves in part 70 (illustrated very schematically in FIGS. 1, 2, 3A, 3B, 4A, 4B and 5) and derive therefrom structural information concerning part 70.

In some embodiments, inspection system 100 may further include a thermography unit 50 comprising an infrared camera 125. Thermography unit 50 may be configured to measure an amount of energy originated from photoacoustic excitation laser 92 and absorbed by part 70. Energy dissipation profile in part 70 may be affected by, for example, zone 80 (e.g., defect in part 70). Accordingly, in some embodiments, inspection system 100 may be further configured to determine, for example, a type, size, shape and/or position, of zone 80 based on readings of infrared camera 125. Inspection system 100 may be further configured to take the readings of thermography units 50 and/or infrared camera 125 into consideration while analyzing set (or sets) 115 of translations (e.g., determined as described above with respect to FIGS. 1-3), to, for example, avoid misinterpretation of a reduction in absorbed energy as a defect 80 in part 70. For example, energy dissipation profile in part 70 may depend on the properties (color and material) of the excited surface. The less energy absorbed, the weaker the photoacoustic signal is, and therefore the weaker is the signal of the translation derived from correlation between speckle patterns is received. Inspection system 100 may be configured to monitor changes in the amount of energy absorption during operation, and correlate the energy absorption changes with the detected signal to avoid false detection of defects in signals which are actually due to the changes in energy absorption.

Inspection system 100 may further include a three-dimensional (3D) imaging unit 55 configured to provide 3D images of part 70. Alternatively or complementarily, 3D images of part 70 may be predetermined (e.g., prior to an inspection procedure) and supplied to 3D imaging unit 55 as an input (e.g., in a 3D file format). In some embodiments, 3D imaging unit 55 may be configured to calculate dimensions of the excitation laser beam spot on the surface 85 of part 70 to, for example, determine an ultrasonic pressure generated in part 70. In some embodiments, combining of imaging data from various sources (e.g., thermography unit 50 and/or 3D imaging unit 55) may improve the accuracy and efficiency of defect 80 detection. In certain embodiments, inspection system 100 may implement gated imaging using multiple illuminators 110 to enhance sensing at high frequencies.

Figure 6A:
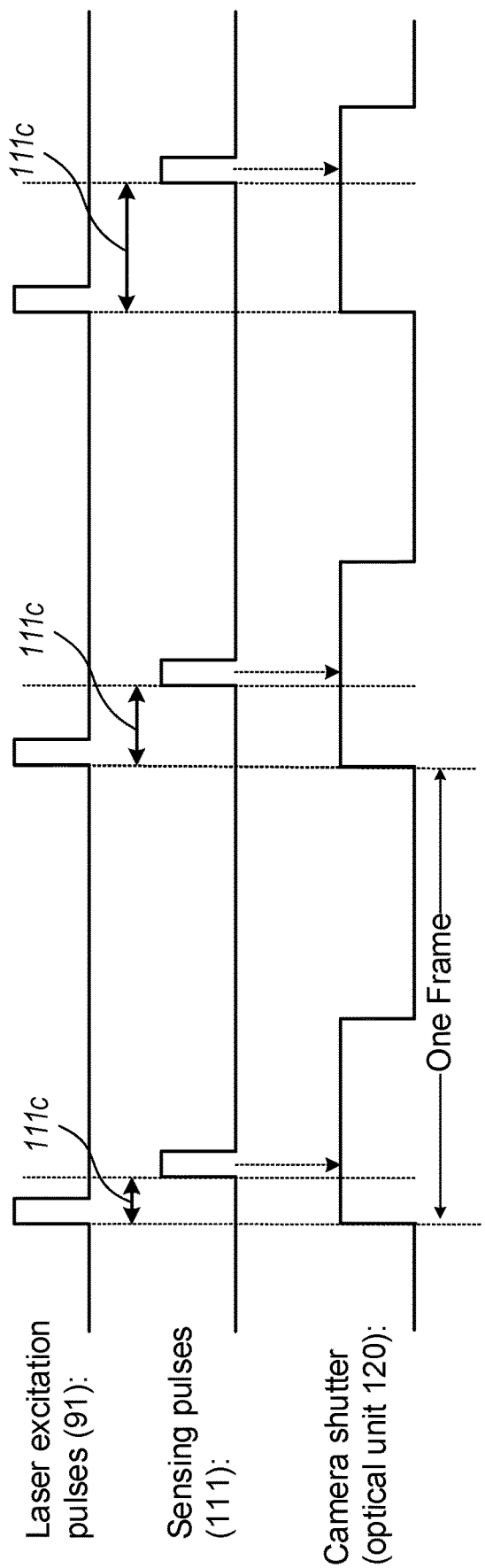
FIG. 6A is a high level schematic illustration of a time diagram for laser excitation pulses, sensing pulses and exposures of detector, according to some embodiments of the invention.

FIG. 6A is a high level schematic illustration of a time diagram for laser excitation pulses 91, sensing pulses 111 and exposures of detector 130, according to some embodiments of the invention.

In some embodiments, pulse duration of excitation beam 91 (e.g., pulsed laser(s) 92) and pulse duration of sensing beam 111 (e.g., generated by illuminator(s) 110) are determined based on, for example, a desired resolution and/or physical properties of part 70. For example, for a required resolution of ξ=1 mm, a pulse duration of excitation beam 91, $T_{excitation}$ (e.g., generated by pulsed laser(s) 92), should be larger than ξ/$V_{sound}$ (e.g., $V_{sound}$ being the speed of sound in tested part 70), e.g., $T_{pulse} < 2 \cdot 10^{-6}$ sec for $V_{sound}$=2000 m/sec; and a pulse duration of sensing beam 111 (from illuminator(s) 110), and as a result detector's 130 exposure duration must be shorter at least half the excitation pulse duration, $T_{detector} = T_{sensing} < 0.5 \cdot T_{excitation} = 1 \cdot 10^{-6}$ sec. However, detector's 130 exposure duration (e.g., a camera shutter exposure duration) may be substantially larger that required $T_{sensing}$. In some embodiments, a delay 111c between excitation pulse 91 and sensing pulse 111 may be set to vary during part's 70 inspection procedure. For example, delay 111c may be increased between two sequential excitation/sensing cycles (e.g., as shown in FIG. 6A). Increasing delay 111c may enable acquiring speckle pattern images at different time points during detector's 130 exposure time $T_{detector}$ thereby increasing an effective sampling frequency of detector 130. For example, a camera having sensing rate of 1 kHz may be configured to capture at an effective rate of 2 MHz.

In some embodiments, changing delay 111c between the sensing and excitation pulses 111, 91 respectively, may be configured for measuring the depth of defect 80 in part 70 and may be used to relate to the depth of defect 80 (upon excitation, an acoustic pulse starts propagating in part 70 and generate echo signals scattered off defect 80 to the excitation surface, distorting the surface and measured by sensing beam 111). Illumination of part 70 by illuminator laser 110 may be carried out at various intervals with respect to illumination of part 70 by excitation laser 92, and the time required for the acoustic pulse to propagate from the part's surface to zone 80 (e.g., a defect in part 70) and back may be is determined with respect to the acoustic wave velocity in the part's 70 material (the deeper the defect, the longer is the way the acoustic pulse needs to pass back and forth and the propagation time becomes longer).

Figure 6B:
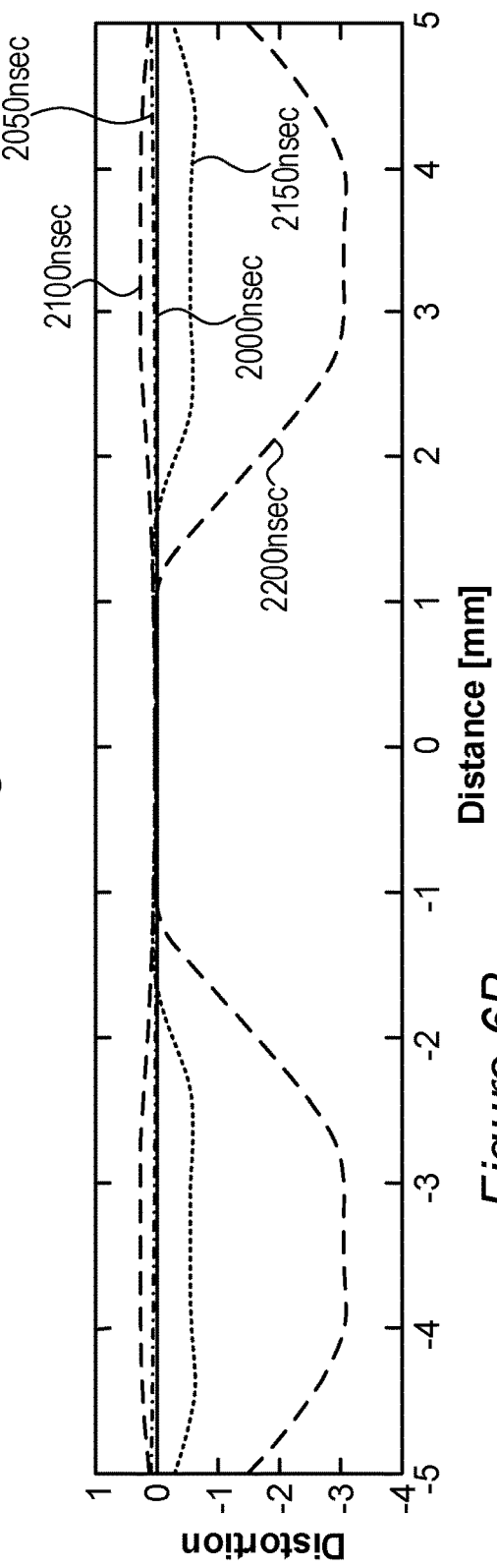
FIG. 6B is a non-limiting example of a simulation of part deformation upon photoacoustic excitation, according to some embodiments of the invention.

FIG. 6B is a non-limiting example of a simulation of part deformation upon photoacoustic excitation, according to some embodiments of the invention. Part distortion is illustrated with respect to the distance from the simulated excitation point at five times after the application of the excitation pulse. The delay between sensing pules 111 and excitation pulse 91 may be determined to achieve maximal distortion and therefore high sensitivity of inspection system 100 to the photoacoustic excitation and defect detection.

Figure 6C:
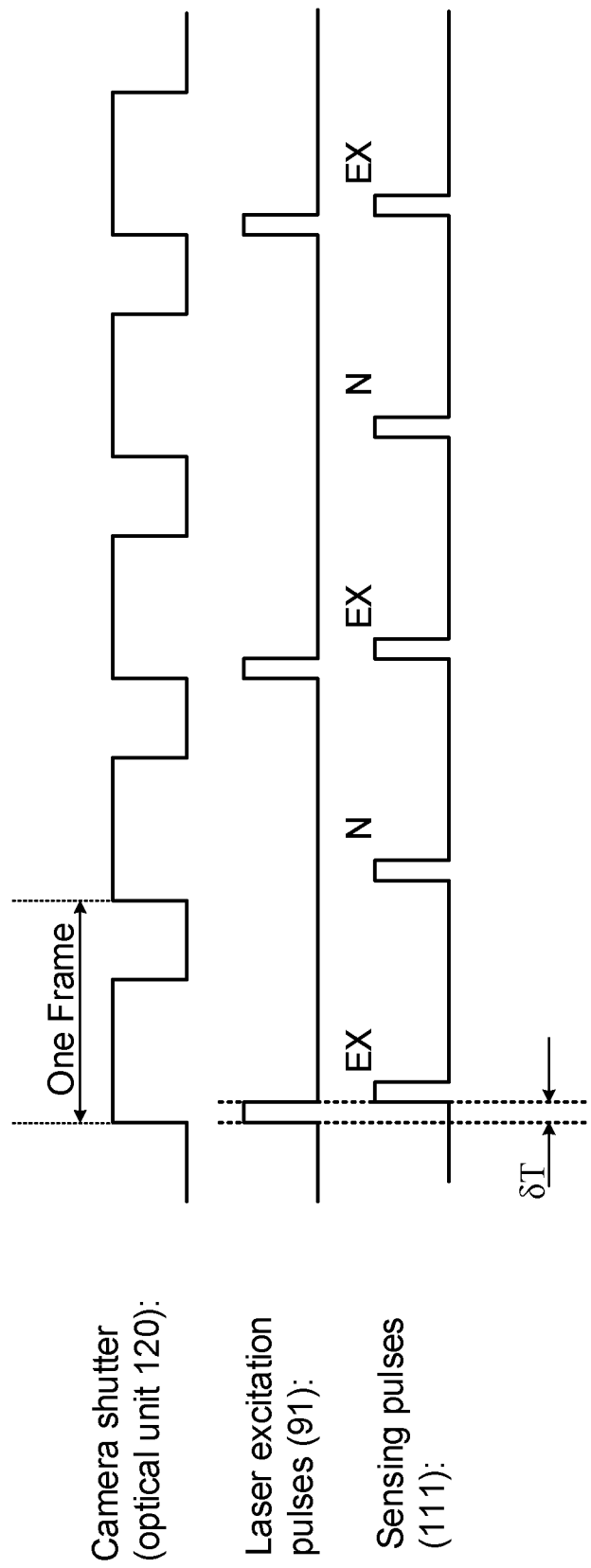
FIG. 6C is a high level schematic illustration of a time diagram for laser excitation pulses, sensing pulses and exposures of detector, according to some embodiments of the invention.

FIG. 6C is a high level schematic illustration of a time diagram for laser excitation pulses 91, sensing pulses 111 and exposures of detector 130, according to some embodiments of the invention. FIG. 6C illustrates an alternative or complementary (with respect to FIG. 6A) timing scheme of illumination pulses 111 with respect to excitation pulses 91. For example, the frequency of sensing laser pulses 111 may be twice the frequency excitation laser pulse 91 to make every pair of sequential speckle patterns 114 includes one speckle pattern 114 affected by excitation pulse 91 (pulses 111 denoted "EX"), and one speckle pattern 114 which is not affected by excitation pulse 91 (pulses 111 denoted "N") by it. The interval between pulses 91 and 111, denoted "δT", may be zero, or determined as explained above (e.g., according to the sound propagation time in the part material). Speckle patterns 114 affected by excitation pulses 91 (pulses 111 denoted "EX") may be further compared (e.g., by analysis unit 160) to at least one subsequent or preceding speckle pattern 114 which are not affected by excitation pulse 91 (pulses 111 denoted "N"). In some embodiments, the comparison thereof may, for example, reduce a measurement noise.

Certain embodiments may include an inspection system including: a photoacoustic excitation unit 90 including at least one pulsed laser source 92 configured to illuminate at least one predetermined position 71 on a part 70 and generate thereby ultrasonic excitation 94 of the part; and a thermography unit 50 configured to measure an amount of energy originated from photoacoustic excitation unit 50, to measure an amount of energy absorbed by part 70, and to determined, based on the originated amount of energy and the absorbed amount of energy, at least one zone 80 within part 70. In some embodiments, at least one zone 80 may include at least one of: cracks, inhomogeneity, inclusions, defects of part 70 or any combination thereof. In some embodiments, thermography unit 50 may include at least one infrared camera 125 configured to determine energy dissipation profiles in part 70 undergoing the ultrasonic excitation, and wherein thermography unit 50 is further configured to determine, based on the energy dissipation profiles, at least one zone 80 within part 70.

Figure 7:
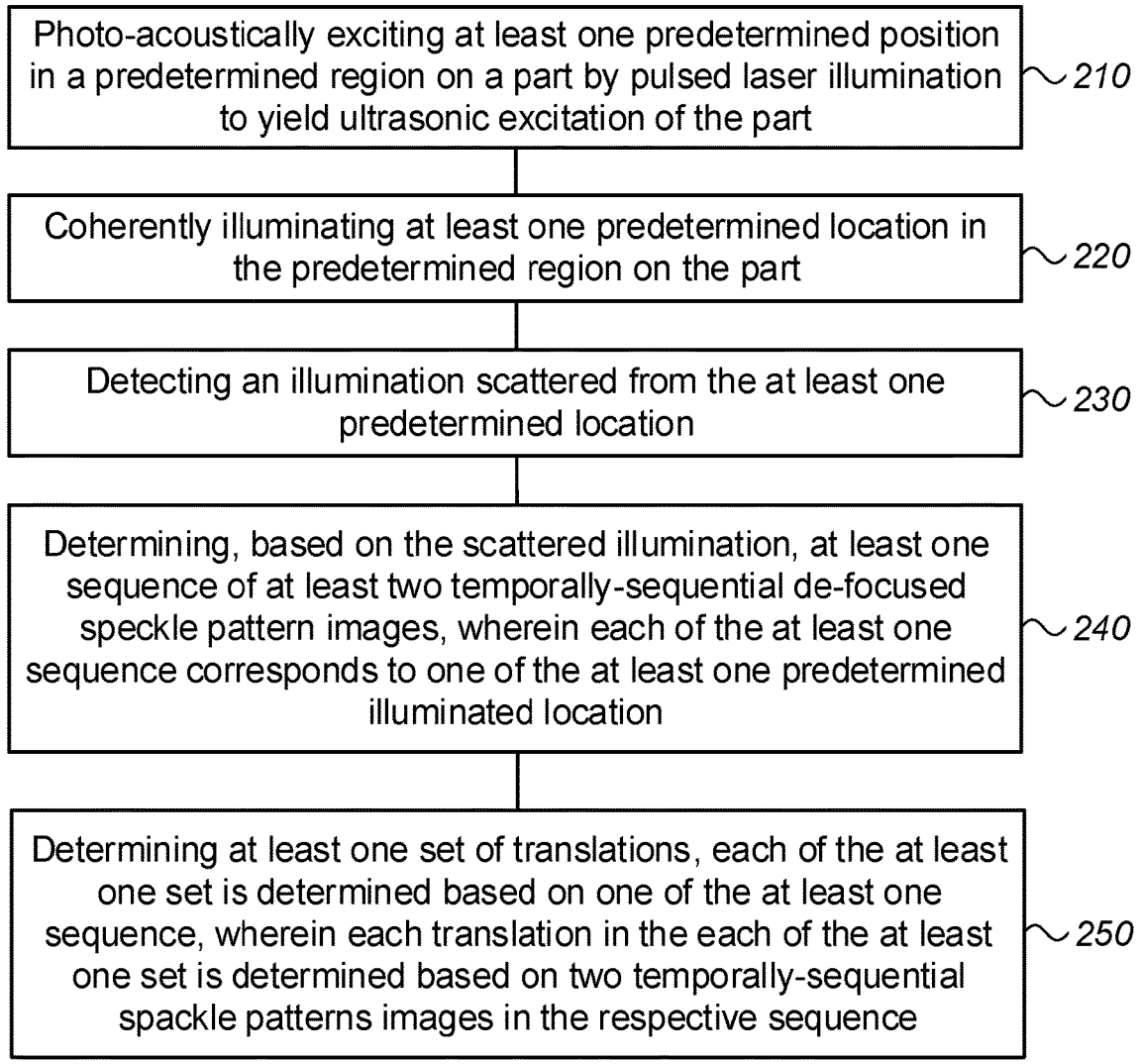
FIG. 7 is a high level flowchart illustrating an inspection method, according to some embodiments of the invention.

FIG. 7 is a high level flowchart illustrating an inspection method 200, according to some embodiments of the invention. The method stages may be carried out with respect to inspection system 100 described above, which may optionally be configured to implement method 200. Method 200 may be at least partially implemented by at least one computer processor. Certain embodiments include computer program products comprising a computer readable storage medium having computer readable program embodied therewith and configured to carry out of the relevant stages of method 200. Method 200 may include stages for producing, preparing and/or using system 100, such as any of the following stages, irrespective of their order.

Method 200 may include photo-acoustically exciting at least one predetermined position in a predetermined region on a part by pulsed laser illumination to yield ultrasonic excitation of the part (stage 210).

Method 200 may include coherently illuminating at least one predetermined location in the predetermined region on the part (stage 220).

Method 200 may include detecting an illumination scattered from the at least one predetermined location (stage 230).

Method 200 may include determining, based on the scattered illumination, at least one sequence of at least two temporally-sequential de-focused speckle pattern images, wherein each of the at least one sequence corresponds to one of the at least one predetermined illuminated location (stage 240).

Method 200 may include determining at least one set of translations, each of the at least one set is determined based on one of the at least one sequence, wherein each translation in the each of the at least one set is determined based on two temporally-sequential speckle patterns images in the respective sequence (stage 250). In some embodiments, each translation in each of the at least one set includes an information regarding a measure of similarity of the two temporally-sequential speckle patterns images thereof as a function of the displacement of one relative to the other. In some embodiments, each translation in each of the at least one set is determined using a cross-correlation between two temporally-sequential speckle pattern images in the respective set. Alternatively or complementarily, the translations of the speckle pattern images may be determined by applying, for example, at least one of a feature based registration, machine learning algorithm or other image registration technique on the sequence of the speckle pattern images thereof.

In some embodiments, method 200 may further include determining, based on the at least one set of translations, an angular distortion of the at least one predetermined location within the part and further determining, based on the angular distortion of the at least one predetermined location, an intensity pattern of the ultrasonic excitation propagating through the at least one predetermined location.

In some embodiments, method 200 may further include identifying, based on the intensity pattern of the ultrasonic excitation propagating through the at least one predetermined location, at least one zone in the part, wherein the at least one zone includes at least one of: cracks, inhomogeneity, inclusions, defects in the part or any combination thereof.

In some embodiments, method 200 may further include coherently illuminating multiple predetermined locations within the predetermined region with multiple narrow coherent beams to yield corresponding multiple sequences of temporally-sequential speckle pattern images. In some embodiments, method 200 may further include determining multiple sets of translations, based on the multiple sequences thereof, wherein each of the multiple sets corresponds to one of the multiple predetermined locations.

In some embodiments, method 200 may further include coherently illuminating multiple predetermined locations within the predetermined region with a single wide beam to yield a sequence of temporally-sequential speckle patter images comprising data regarding the multiple predetermined locations, wherein each speckle pattern image in the sequence thereof includes multiple image parts, and wherein each of the multiple image parts corresponds to one of the multiple predetermined locations on the part. In some embodiments, method 200 may further include determining multiple sets of translations based on the image parts thereof, wherein each of the multiple sets corresponds to one of the multiple predetermined locations.

In some embodiments, method 200 may further include splitting coherent illumination beam into a sensing beam and a reference beam and configuring the sensing and reference beams to illuminate a predetermined sensing and reference locations, respectively, to yield corresponding sensing and reference sequences of temporally-sequential speckle patter images, respectively. In some embodiments, method 200 may further include determining a sensing and a reference sets of translations based on the sensing and reference sequences, respectively, wherein the sensing and reference sets correspond to predetermined sensing and reference locations, respectively.

In some embodiments, method 200 may further include comparing at least two sets of translations each corresponding to a different predetermined location on the part and further determining, based on the comparison thereof, a whole-body movement of the at least one predetermined location and to distinguish the whole-body movement from the ultrasonic excitation of the at least one predetermined location. In some embodiments, wherein the whole-body movement include at least one of translational movements, rotational movements, vibrations or any combination thereof.

In some embodiments, method 200 may further include determining a lateral shift between a photoacoustic excitation beam and a coherent illumination beam to provide maximal amplitude of signals determined based on the at least one sets of translations.

In some embodiments, method 200 may further include determining a pulse duration of the photoacoustic excitation beam and a pulse duration of the coherent illumination beam based on at least one of a desired spatial resolution, physical properties of the part or any combination thereof.

In some embodiments, method 200 may further include increasing a delay between a photoacoustic excitation pulse and coherent illumination pulse during an inspection procedure to increase thereby an effective sampling rate.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A part inspection system comprising:
a photoacoustic excitation unit comprising at least one pulsed laser source configured to illuminate at least one predetermined position on a part and generate thereby ultrasonic excitation of the part;
a coherent illuminator configured to illuminate at least one predetermined location on the part with coherent illumination, the at least one predetermined position illuminated by the at least one pulsed laser source is at a predetermined lateral shift with respect to the at least one predetermined location illuminated by the coherent illuminator;
a detector;
an optical unit in association with the detector, wherein the optical unit is configured to gather an illumination scattered from the at least one predetermined location to the detector, and wherein the detector is configured to generate, based on the scattered illumination, at least one sequence, wherein each of the at least one sequence comprising at least two temporally-sequential de-focused speckle pattern images of one of the at least one predetermined illuminated location; and
an image analysis unit configured to:
receive the at least one sequence; and
determine at least one set of speckle pattern image translations, each of the at least one set is determined based on one of the at least one sequence, wherein each speckle pattern image translation in each of the at least one set is determined based on two temporally-sequential speckle patterns images in the respective sequence, and
wherein the at least one predetermined position illuminated by the at least one pulsed laser source is at a predetermined lateral shift ($\delta x$, $\delta z$) with respect to the at least one predetermined location illuminated by the coherent illuminator, and
wherein the part inspection system is configured to determine and control the lateral shift, by selecting the lateral shift which provides a maximal signal of translation derived from correlation between speckle patterns.

2. The inspection system of claim 1, wherein the image analysis unit is further configured to:

determine, based on the at least one set of speckle pattern image translations, an angular distortion ($\Delta\varphi$) of the at least one predetermined location within the part;

determine, based on the angular distortion ($\Delta\varphi$) of the at least one predetermined location, an intensity pattern of the ultrasonic excitation propagating through the at least one predetermined location; and identify, based on the intensity pattern of the ultrasonic excitation propagating through the at least one predetermined location, at least one zone comprising at least one of cracks, inhomogeneity, inclusions, defects of the part or any combination thereof.

3. The inspection system of claim 1:
wherein the coherent illuminator is configured to illuminate multiple predetermined locations with multiple beams,
wherein the optical unit further comprises a mask at a focusing plane of the optical unit and configured to gather corresponding multiple scattered beams to corresponding multiple predetermined regions on the detector to yield corresponding multiple sequences of temporally-sequential speckle pattern images; and
wherein the image analysis unit is further configured to determine multiple sets of speckle pattern image translations, based on the multiple sequences thereof, wherein each of the multiple sets corresponds to one of the multiple predetermined locations.

4. The inspection system of claim 1:
wherein the coherent illuminator is configured to illuminate multiple predetermined locations with a single beam,
wherein the optical unit further comprises an aperture configured to gather a scattered beam to the detector to yield a sequence of temporally-sequential speckle pattern images comprising data regarding the multiple predetermined locations, wherein each speckle pattern image in the sequence thereof comprises multiple image parts, wherein each of the multiple image parts corresponds to one of the multiple predetermined locations on the part, and
wherein the image analysis unit is further configured to determine multiple sets of speckle pattern image translations based on the image parts thereof, wherein each of the multiple sets corresponds to one of the multiple predetermined location.

5. The inspection system of claim 1:
wherein coherent illumination beam is being split into a sensing beam and a reference beam configured to illuminate a predetermined sensing and reference locations, respectively,
wherein the optical unit is configured to gather corresponding scattered sensing and reference beams to predetermined regions on the detector to yield corresponding sensing and reference sequences of temporally-sequential speckle pattern images; and
wherein the analysis unit is further configured to determine a sensing and a reference sets of speckle pattern image translations based on the sensing and reference sequences, respectively, wherein the sensing and reference sets correspond to predetermined sensing and reference locations, respectively.

6. The inspection system of claim 1, wherein the image analysis unit is further configured to compare at least two sets of speckle pattern image translations each corresponding to a different predetermined location on the part and further to determine, based on the comparison thereof, a whole-body movement of the at least one predetermined location and to distinguish the whole-body movement from the ultrasonic excitation of the at least one predetermined location.

7. The inspection system of claim 1, wherein the lateral shift between an excitation beam from the photoacoustic excitation unit and an illumination beam from the coherent illuminator is determined to provide maximal amplitude of signals determined based on the at least one sets of translations.

8. The inspection system of claim 1, wherein a pulse duration of the excitation beam and a pulse duration of the illumination beam are determined based on at least one of a desired spatial resolution, physical properties of the part or any combination thereof.

9. The inspection system of claim 1, wherein a delay between a pulse of the excitation beam and a pulse of the illumination beam is configured to increase during an inspection procedure of the part to enable acquiring of speckle pattern images at different time points during an exposure time of the detector to thereby increase an effective sampling rate of the detector.

10. The inspection system of claim 1, wherein a frequency of illumination pulses from the coherent illuminator is based on a frequency of excitation pulses from the photoacoustic excitation unit, to denote illumination pulses that are affected by corresponding excitation pulses (EX) and illumination pulses that are not affected by corresponding excitation pulses (N) and the image analysis unit is further configured to compare speckle patterns from affected (EX) and non-affected (N) illumination pulses.

11. The inspection system of claim 1, further comprising a three-dimensional (3D) imaging unit configured to provide 3D images of the part.

12. A method of photoacoustic inspection of a part, the method comprising:
photo-acoustically exciting at least one predetermined position in a predetermined region on a part by pulsed laser illumination to yield ultrasonic excitation of the part;
coherently illuminating at least one predetermined location in the predetermined region on the part, wherein the at least one predetermined location is at a predetermined lateral shift with respect to the at least one predetermined position;
detecting an illumination scattered from the at least one predetermined location;
determining, based on the scattered illumination, at least one sequence of at least two temporally-sequential de-focused speckle pattern images, wherein each of the at least one sequence corresponds to one of the at least one predetermined illuminated location;
determining at least one set of speckle pattern image translations, each of the at least one set is determined based on one of the at least one sequence, wherein each speckle pattern image translation in the each of the at least one set is determined based on two temporally-sequential speckle patterns images in the respective sequence; and
wherein the at least one predetermined position illuminated by the pulsed laser illumination is at a predetermined lateral shift ($\delta x$, $\delta z$) with respect to the at least one predetermined location which is coherently illuminated, and
wherein the part inspection system is configured to determine and control the lateral shift, by selecting the lateral shift which provides a maximal signal of translation derived from correlation between speckle patterns.

13. The method of claim 12, further comprising:
determining, based on the at least one set of translations, an angular distortion of the at least one predetermined location within the part;
determining, based on the angular distortion of the at least one predetermined location, an intensity pattern of the ultrasonic excitation propagating through the at least one predetermined location; and
identifying, based on the intensity pattern of the ultrasonic excitation propagating through the at least one predetermined location, at least one zone in the part, wherein the at least one zone comprises at least one of: cracks, inhomogeneity, inclusions, defects in the part or any combination thereof.

14. The method of claim 12, further comprising:
coherently illuminating multiple predetermined locations within the predetermined region with multiple narrow coherent beams to yield corresponding multiple sequences of temporally-sequential speckle pattern images; and
determining multiple sets of translations, based on the multiple sequences thereof, wherein each of the multiple sets corresponds to one of the multiple predetermined locations.

15. The method of claim 12, further comprising:
coherently illuminating multiple predetermined locations within the predetermined region with a single wide beam to yield a sequence of temporally-sequential speckle pattern images comprising data regarding the multiple predetermined locations, wherein each speckle pattern image in the sequence thereof comprises multiple image parts, and wherein each of the multiple image parts corresponds to one of the multiple predetermined locations on the part; and
determining multiple sets of translations based on the image parts thereof, wherein each of the multiple sets corresponds to one of the multiple predetermined location.

16. The method of claim 12, further comprising:
splitting coherent illumination beam into a sensing beam and a reference beam;
configuring the sensing and reference beams to illuminate a predetermined sensing and reference locations, respectively, to yield corresponding sensing and reference sequences of temporally-sequential speckle pattern images, respectively; and
determining a sensing and a reference sets of translations based on the sensing and reference sequences, respectively, wherein the sensing and reference sets correspond to predetermined sensing and reference locations, respectively.

17. The method of claim 12, further comprising:
comparing at least two sets of translations each corresponding to a different predetermined location on the part; and
determining, based on the comparison thereof, a whole-body movement of the at least one predetermined location and to distinguish the whole-body movement from the ultrasonic excitation of the at least one predetermined location.

18. The method of claim 12, further comprising determining the lateral shift between a photoacoustic excitation beam and a coherent illumination beam to provide maximal amplitude of signals determined based on the at least one sets of translations.

19. The method of claim 12, further comprising determining a pulse duration of the photoacoustic excitation beam and a pulse duration of the coherent illumination beam based on at least one of a desired spatial resolution, physical properties of the part or any combination thereof.

20. The method of claim 12, further comprising increasing a delay between a photoacoustic excitation pulse and coherent illumination pulse during an inspection procedure to increase thereby an effective sampling rate.

* * * * *